United States Patent [19]
Lee et al.

[11] Patent Number: 5,995,012
[45] Date of Patent: Nov. 30, 1999

[54] SYSTEM STATUS DISPLAYING DEVICE

[75] Inventors: Jae-Hoon Lee, Seoul; Moon-Hyoung Lee, Kwangmyoung, both of Rep. of Korea

[73] Assignee: Samsung Electronics Co., Ltd., Rep. of Korea

[21] Appl. No.: 09/032,298

[22] Filed: Feb. 27, 1998

[30] Foreign Application Priority Data

Mar. 14, 1997 [KR] Rep. of Korea .......................... 97-8615

[51] Int. Cl.⁶ .................................................. G08B 5/22
[52] U.S. Cl. ................................ 340/815.45; 340/815.65; 340/525; 345/48; 345/150; 345/199; 345/904; 362/800
[58] Field of Search ......................... 340/815.45, 815.65, 340/525; 345/48, 150, 186, 199, 903, 904; 362/800

[56] References Cited

U.S. PATENT DOCUMENTS

| | | | |
|---|---|---|---|
| 4,837,565 | 6/1989 | White | 340/815.45 |
| 4,845,481 | 7/1989 | Havel | 340/815.45 |
| 5,194,854 | 3/1993 | Havel | 340/815.65 |
| 5,202,679 | 4/1993 | Tulpule et al. | 340/815.45 |

*Primary Examiner*—Donnie L. Crosland
*Attorney, Agent, or Firm*—Dilworth & Barrese

[57] ABSTRACT

A status displaying device includes a plurality of modules each having a plurality of channels to display system status. The status displaying device comprises a plurality of LEDs corresponding to the number of the channels so as to display the system status by changing colors of the LEDs according to the module states.

14 Claims, 4 Drawing Sheets

SYSTEM STATUS DISPLAYING DEVICE

BACKGROUND OF THE INVENTION

1. Field of the Invention

The present invention relates to a system status displaying device, and more particularly, to a device capable of reducing the number of light emitting diodes (LEDs) used for displaying a system status.

2. Description of the Related Art

The LED has found a multitude of roles in the field of opto-electronics, for example, indicators on hi-fi equipment, electronic telephone sets, cathode-ray tube phosphors, etc. LEDs are applied to various systems for their light emitting properties. In another example, LEDs are attached to a plurality of functional modules in a communication system housed in a cabinet so as to indicate the normal or abnormal function of the modules by giving off visible light.

Referring to FIG. 1, a prior art system is illustrated comprising a first module 10 and a second module 20. The first module 10 in the above system includes a first channel (CH1) 11 to a fourth channel (CH4) 14. Also, the second module 20 includes a first channel (CH1) 21 to a fourth channel (CH4) 24. The above system further comprises an LED controller 30 for sensing and displaying the states of each of channels of first and second modules 10 and 20. The LED controller 30 comprises LED 31-1 through 31-4 corresponding to the first channel (CH1) 11 through the fourth channel (CH4) 14 of the first module 10, and LED 32-1 through 31-4 of the first channel (CH1) 21 through the fourth channel (CH4) 24 of the second module 20.

According to FIG. 1, a conventional system is shown which includes a plurality of modules each of which comprises a plurality of channels having a system status displaying device with LEDs corresponding to each of the channels. A large number (modules×channels) of LEDs are required for a conventional communication system having a plurality of modules and channels. This is a drawback of the prior art system. A further disadvantage of the prior art system is that the size of printed circuit board (PCB) accommodating the LEDs becomes larger as the number of LEDs increases. Further, LEDs are typically continuously operated, even when not needed, resulting in unnecessary power consumption.

SUMMARY OF THE INVENTION

Accordingly, it is an object of the present invention to provide a system status displaying device having a simple structure for a system comprising a plurality of modules each having a plurality of channels.

It is another object of the present invention to prevent the volume of the above system status displaying device from becoming larger even when the number of modules or channels are increased.

It is a further object of the present invention to provide a system status displaying device capable of preventing unnecessary power consumption.

The system status displaying device, according to one embodiment of the present invention comprises LEDs corresponding to the number of channels of only one of the modules to thereby display system status by changing colors of the LEDs according to module states, so that the toggling times of the LEDs is changed.

The system status displaying device according to another embodiment of the present invention comprises a plurality of modules each comprising a plurality of channels, storage means for storing color information for channels of the above modules to distinguish between displayed module states, a plurality of selectors each of which receives signals only from a same channel among all the channels of the modules and outputs color information corresponding to a channel signal of any one of the modules by retrieving/selecting the color information from the storage means according to a specified selection signal, and a plurality of LEDs which are each connected to the respective output terminals of the selectors, thereby displaying module states by colors corresponding to color information transmitted from the selectors.

A status displaying device of a system according to another aspect of the present invention comprises a plurality of modules each having a plurality of channels; storage means for storing color information and toggling velocity information for said channels of said modules to distinguish between displayed module states; a plurality of selectors each of which receives signals from said channels of said modules and outputs color information and toggling velocity information corresponding to a channel signal of any one of said modules by retrieving/selecting said color information and said toggling velocity information from said storage means according to a specified selection signal; and a plurality of LEDs connected to the respective output terminals of said selectors, thereby displaying states by colors and toggling velocity corresponding to said color information and said toggling velocity information transmitted from said selectors.

With LEDs as many as the number of the channels of the system, the system status displaying device can change the color and the toggling velocity of the LEDs to display the status of the respective modules. Accordingly, with an increase in the number of the modules and channels, the system status displaying device remains simple in structure. Further, when the system door is closed, power consumption may be reduced.

The present invention will now be described more specifically with reference to the drawings and the following examples are given to allow those skilled in the art to better understand the present invention.

DETAILED DESCRIPTION OF PREFERRED EMBODIMENTS

Figure 1:
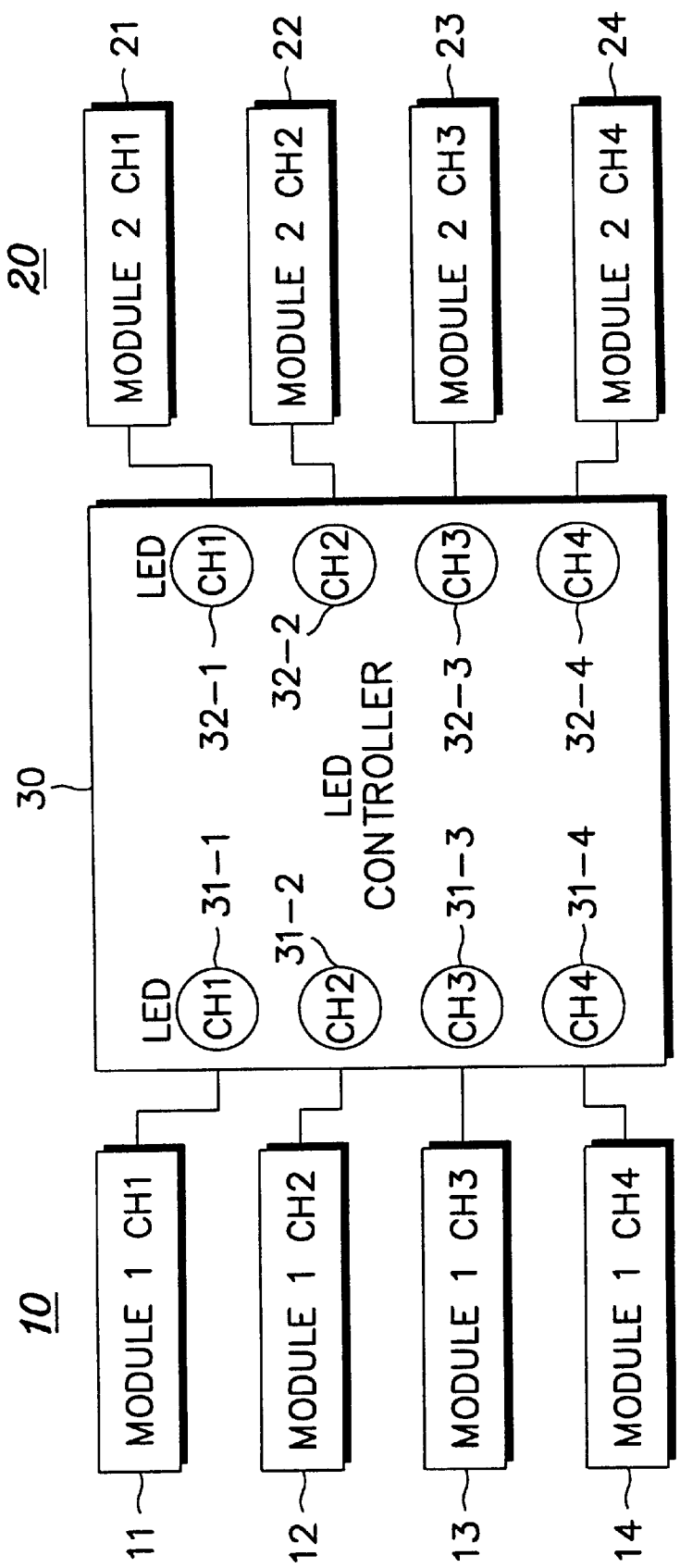
FIG. 1 is a block diagram illustrating the structure of a system status displaying device according to the prior art.
Figure 2:
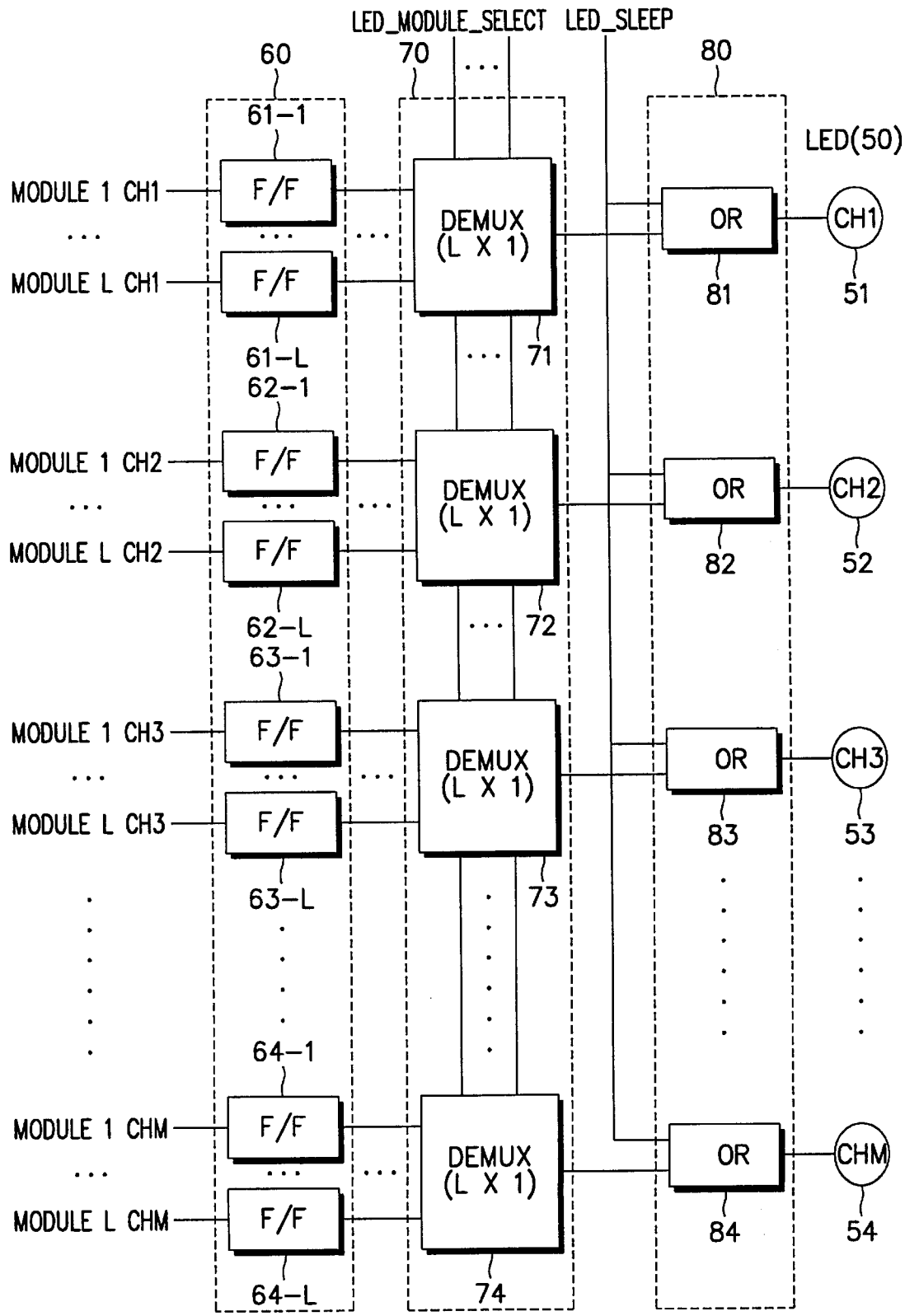
FIG. 2 is a block diagram illustrating the structure of a system status displaying device according to a first embodiment of the present invention.

FIG. 2 shows an example of a system status displaying device according to a first embodiment of the present invention which includes L modules, each having M channels. Accordingly, the number of states of a system to be displayed equals modules(L)×channels(M). As for the number of LEDs, the conventional system status displaying device requires LEDs equivalent to L×M. The present invention reduces the number of LEDs to the number of channels (M) as shown in FIG. 2. LEDs 51 through 54 correspond to each channel shown. The illustrative system status displaying device according to the present invention does not need the number of LEDs to be L×M−M, but instead, includes a demultiplexer (DEMUX) group 70 and a flip-flop (F/F) group 60 to provide a reduced number of LEDs.

The demultiplexer group 70 includes demultiplexers 71 through 74 corresponding to M channels. These demultiplexers 71 through 74 are multiplexers of L×1, each of which selects any one module from among L modules according to an LED Module Select signal. The LED Module Select signal is a module selection signal for selecting any one module from among a plurality of modules.

The flip-flop group 60 includes flip-flops 61-1 through 61-L, 62-1 through 62-L, 63-1 through 63-L and 64-1 through 64-L which is equivalent to modules(L)×channels (M), each flip-flop being connected to respective channels of all the modules and serving as a memory for storing display states of LED group 50, i.e., the display states are represented by different colors. The reason for requiring flip-flops 60 is to enable users to better identify the modules according to the colors displayed. The same LED may be used for displaying the state of a module selected by demultiplexers 71 through 74 according to the LED Module Select signal. When the first channel's state for the first module or the L-th module is displayed, the same LED 51 of the first channel is lit in both cases. It would be impossible to identify the right channel for the correct module when the same LED 51, for example, is lit with the same color in both cases.

Therefore, to identify the status of the correct module, the system status displaying device of the present invention comprises flip-flops 61-1 through 64-L storing data for displaying color information corresponding to the respective channels of modules or changing a toggling velocity for the LEDs. Assuming that the number of displayable color states is $2^n$, the flip-flops 61-1 through 64-L store data of n bits. For example, assuming that the available number of color states is $2^2=4$ as shown in the Table 1, flip-flops 61-1 through 64-L store data of 1 bit.

TABLE 1

| Number of bits | | Color |
| --- | --- | --- |
| 0 | 0 | ORANGE |
| 0 | 1 | RED |
| 1 | 0 | GREEN |
| 1 | 1 | OFF |

The system status displaying device of the present invention further includes NOR gates 81 through 84. These OR gates 81–84 are each connected between demultiplexers 71–74 and LEDs 51–54 respectively, thereby conditionally lighting the corresponding LEDs 51–54 when an output signal appears from demultiplexers 71–74 as enabled by a LEDSleep signal. The lighting relations are shown in the Table 2, and the above LEDSleep signal is intended for conditionally lighting LEDs 51–54, for example, depending on whether a system door is open or closed.

In this example, if system door is closed, it may not be viewable by an operator, and unnecessary power is consumed. The LEDSleep signal turns the LEDs 51–54 off when the system door is closed to reduce power consumption by LEDs 51–54.

TABLE 2

| DEMUX output | LEDSleep Signal | OR |
| --- | --- | --- |
| 0 | 0 | 0 |
| 0 | 1 | 1 |
| 1 | 0 | 1 |
| 1 | 1 | 1 |

Referring to Table 2, when the LEDSleep signal level is "0", it means that the system door is open, and when the LEDSleep signal level is "1", it means that the system door is closed. When the DEMUX level is "0", it means that the DEMUX output for turning on the LED is present, and when the DEMUX level is "1", it means that the DEMUX output for turning on the LED is absent. Accordingly, when the DEMUX output is present (DEMUX level is "0") and the system door is closed (LEDSleep signal level is "1"), the OR gates 81–84 interrupt the displaying of channel states for each module. Since the LEDs are not lit when the system door is closed, the power consumption can be reduced.

The operation of the system status displaying device when displaying the states of first module is described as follows. The LED Module Select signal is first applied to select the first module, and then, the demultiplexers 71–74 each select the respective outputs of flip-flops 61-1, 62-1, 63-1 and 64-1 from among the flip-flop group 60 to apply them to the OR gates 81–84. When receiving the LEDSleep signal with level "0", the OR gates 81–84 further transmit the outputs of flip-flops 61-1, 62-1, 63-1 and 64-1 to light the LEDs 51–54, whereby the user can identify the states of modules by means of the lit colors of the LEDs 51–54. When receiving the LEDSleep signal with level "1", the OR gates 81–84 interrupt the outputs of flip-flops 61-1, 62-1, 63-1 and 64-1 to turn off the LEDs 51–54.

Figure 3:
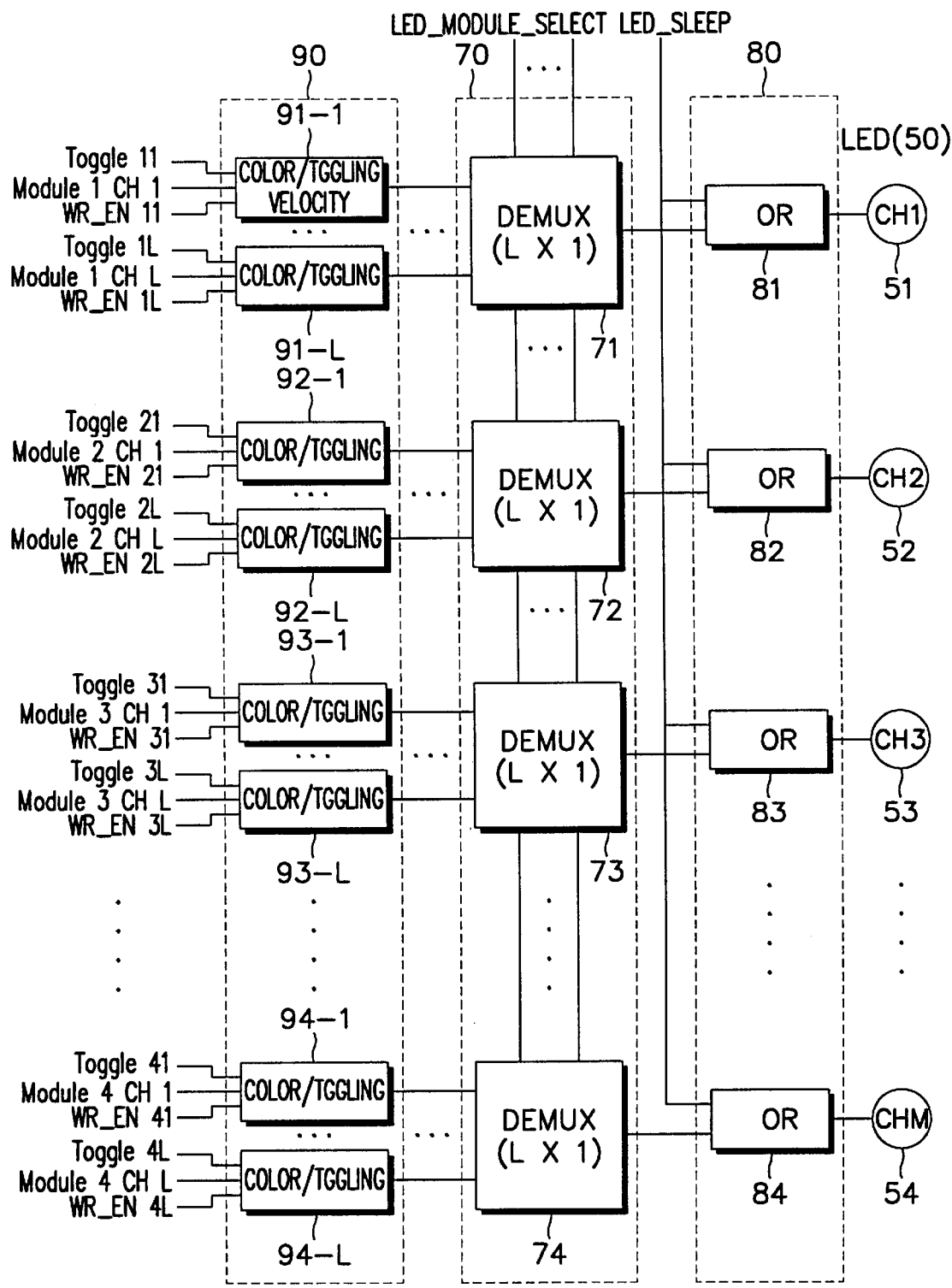
FIG. 3 is a block diagram illustrating the structure of a system status displaying device according to a second embodiment of the present invention.

FIG. 3 shows an example of a system status displaying device according to a second embodiment of the present invention which includes L modules. The system status displaying device is designed to change not only the color but also a toggling cycle (velocity) of the LEDs according to the module status. That is, the system status displaying device according to the second embodiment of the present invention displays the system status by lighting M LEDs (where M is the number of the channels) included therein, and further, changes the color and toggling velocity of the lighted LEDs according to the module status in order to let the user know which module is currently being displayed out of a plurality of the modules. Here, the toggling velocity can be set differently, for example, 1, 2, 5, and 10 seconds, according to the respective modules.

Referring to FIG. 3, the system status displaying device further includes storage means 90 in addition to the system status displaying device of FIG. 2, for storing color information and toggling velocity information of the respective modules. The storage means 90 includes a plurality of color/toggling velocity information storage locations 91-1 through 91-L, 92-1 through 92-L, 93-1 through 93-L, and 94-1 through 94-L. The color/toggling velocity information locations 91-1 through 91-L are connected to the demultiplexer 71 functioning as a selector, the color/toggling velocity information locations 92-1 through 92-L to the demultiplexer 72, the color/toggling velocity information locations 93-1 through 93-L to the demultiplexer 73, and the color/toggling velocity information locations 94-1 through 94-L to the demultiplexer 74. Here, storage means 90 includes L color/toggling velocity information locations (where L is the number of the modules), for providing the color and toggling velocity information according to the module status. The respective color/toggling velocity information locations are constructed as shown in FIG. 4.

Figure 4:
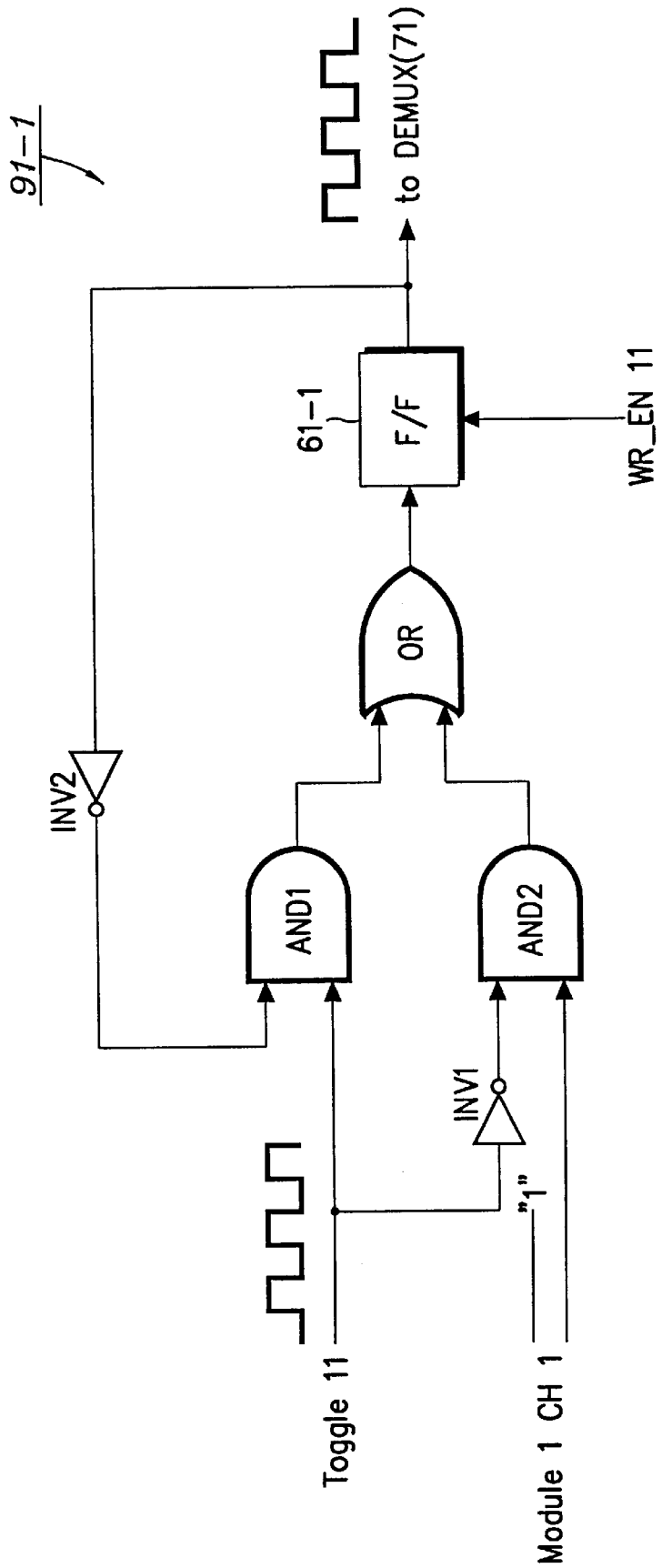
FIG. 4 is a detailed circuit diagram illustrating the structure of a color/toggling velocity information storage of FIG. 3.

Referring to FIG. 4, the color/toggling velocity information location 91-1 includes a flip-flop 61-1 with an output terminal connected to an input terminal of the demultiplexer 71, an OR gate OR, two inverters INV1 and INV2, and two AND gates AND1 and AND2. The OR gate "ORs" output signals of the AND gates AND1 and AND2 received through first and second input terminals thereof, to provide its output signal to an input terminal of the flip-flop 61-1. The first inverter INV1 inverts a toggle signal TOGGLE11 for toggling the lighted LED to display the system status, and provides its output signal to a first input terminal of the second AND gate AND2. The second inverter INV2 inverts an output signal of the flip-flop 61-1, and provides its output signal to a first input terminal of the first AND gate AND1. The first AND gate ANDs the toggle signal TOGGLE11 and an output signal of the second inverter INV2, and provides its output signal to the first input terminal of the OR gate. The second AND gate ANDs an output signal of the first inverter INV1 and a module channel signal MODULE1_CH1 (indicating a first channel of a first module) representing a specified channel of a specified module whose status is to be displayed, and provides its output signal to the second input terminal of the OR gate. The flip-flop 61-1 is enabled in response to a write enable signal WR_EN11, to transfer the output signal of the OR gate to the demultiplexer 71.

The system status displaying device according to the second embodiment of the present invention including the color/toggling velocity information locations changes not only the color but also the toggling velocity of the lighted LEDs according to the module state. Operation of changing the toggling velocity of the LEDs will be described hereinbelow.

Now, if it is requested to display a status of the first channel of the first module, the MODULE1_CH1 signal having level "0" will be applied to one input terminal of the second AND gate. At this moment, if the TOGGLE11 signal is at the level "0", the second AND gate generates an output signal of level "0". The output signal of level "0" is transferred to the multiplexer 71 via the OR gate and the flip-flop 61-1, thereby lighting the LED 51.

In this state, if the TOGGLE11 signal is changed to level "1", the first AND gate receiving the TOGGLE11 signal of level "1" and the output signal of level "1" from the second inverter INV2 will generate an output signal of level "1". At this moment, the second AND gate receiving the MODULE1_CH1 signal of level "0" and the output signal of level "0" from the first inverter INV1 also generates an output signal of level "0". As a result, the flip-flop 61-1 provides the output signal of level "1" to the demultiplexer 71, thereby turning the LED 51 off.

In the state that the LED 51 is turned off, the first AND gate "ANDs" the output signal of level "1" from the second inverter INV2 and the TOGGLE11 signal of level "1" and applies its output signal of level "0" to the input terminal of the flip-flop via the OR gate. At this moment, if the write enable signal WR_EN11 is at the level "1", the flip-flop 61-1 is enabled to transfer the output signal of level "0" to the multiplexer 71, thereby lighting the LED 51.

In this way, the status displaying device according to the second embodiment of the present invention changes not only the color but also the toggling velocity of the lighted LED to display the system status, so that the user may easily recognize the channel and module being displayed.

As described above, the system status displaying device includes a plurality of modules each of which has a plurality of channels. According to the present invention the device includes LEDs corresponding to the number of channels to display the states of the modules. The present invention has the advantages of simplifying and minimizing the structure of the system status displaying device and of reducing unnecessary power consumption by lighting LEDs only when the LEDs need to be viewed by an operator, for example.

Although the present invention is described in detail with reference to the embodiment as described above, it should not be construed as a limitation of the invention itself, and it will be apparent to those skilled in the art that many changes and modifications may be made thereto without departing from the spirit of the present invention. Therefore, the appended claims cover all such changes and modifications which fall within the true spirit and scope of the present invention.

What is claimed is:

1. A status displaying device including a plurality of modules, each module having (M) channels and a system status, said status displaying device comprising (M) LEDs, each of said (M) LEDs for displaying said system status for a common channel from each of said plurality of modules by changing colors of said LEDs according to module states.

2. The status displaying device as recited in claim 1 wherein said system status is displayed by changing a toggling velocity of said LEDs.

3. The status displaying device as recited in claim 1 wherein said module states have at least four states.

4. A status displaying device of a system, comprising:
a plurality of modules each having a plurality of channels;
storage means for storing color information for said channels of said modules to distinguish between displayed module states;
a plurality of selectors each of which receives signals from the channels of said modules and outputs color information corresponding to a channel signal of any one of said modules by retrieving/selecting said color information from said storage means according to a specified selection signal; and
a plurality of LEDs connected to the respective output terminals of said selectors, thereby displaying states by colors corresponding to said color information transmitted from said selectors.

5. The status displaying device as defined in claim 4, wherein said status displaying device further comprises a plurality of logic circuits connected between said selectors and said LEDs, such that said logic circuits allow outputs from said selectors to be applied to said LEDs when a system door is open and interrupt the outputs from said selectors not to be applied to said LEDs when said system door is closed.

6. The status displaying device as defined in claim 5, wherein said logic circuits are OR gates performing OR operations by receiving two inputs, one of which is the output from each of said selectors and another of which is a signal indicating whether said system door is open or closed.

7. The status displaying device as recited in claim 4 wherein said selectors are demultiplexers.

8. The status displaying device as recited in claim 4 wherein the storage means includes flip-flops for each channel connecting to said selectors.

9. A status displaying device of a system, comprising:
a plurality of modules each having a plurality of channels;

storage means for storing color information and toggling velocity information for said channels of said modules to distinguish between displayed module states;

a plurality of selectors each of which receives signals from the channels of said modules and outputs color information and toggling velocity information corresponding to a channel signal of any one of said modules by retrieving/selecting said color information and said toggling velocity information from said storage means according to a specified selection signal; and a plurality of LEDs connected to the respective output terminals of said selectors, thereby displaying states by colors and toggling velocity corresponding to said color information and said toggling velocity information transmitted from said selectors.

10. The status displaying device as defined in claim 9, further comprising a plurality of logic circuits connected between said selectors and said LEDs, such that said logic circuits allow outputs from said selectors to be applied to said LEDs when a system door is open, and interrupt the outputs from said selectors to turn off said LEDs when said system door is closed.

11. The status displaying device as defined in claim 10, wherein said logic circuits are OR gates performing OR operations by receiving two inputs, one of which is the output from each of said selectors and another of which is a signal indicating whether said system door is open or closed.

12. The status displaying device as recited in claim 9, wherein said selectors are demultiplexers.

13. The status displaying device as recited in claim 9, wherein said storage means comprises a plurality of color/toggling velocity information locations each including a flip-flop, an OR gate, first and second inverters, and first and second AND gates;

wherein said OR gate ORs outputs of said first and second AND gates to provide an output thereof to said flip-flop;

wherein said first inverter inverts a toggle signal for toggling lighted LEDs; wherein said second inverter inverts an output of said flip-flop;

wherein said first AND gate ANDs said toggle signal and an output of said second inverter to provide an output thereof to a first input terminal of said OR gate;

wherein second AND gate ANDs an output of said first inverter and a module channel signal for displaying the status of the system to provide an output thereof to a second input terminal of said OR gate.

14. The status displaying device as recited in claim 13, wherein said flip-flop is enabled in response to a write enable signal to transfer an output of said OR gate to the corresponding demultiplexer.

* * * * *